United States Patent [19]

Poertzgen et al.

[11] Patent Number: 5,154,264
[45] Date of Patent: Oct. 13, 1992

[54] FLUID FILLED CYLINDER PISTON DEVICE

[75] Inventors: Gregor Poertzgen, Koblenz; Castor Fuhrmann, Brachtendorf, both of Fed. Rep. of Germany

[73] Assignee: Stabilus GmbH, Koblenz-Neuendorf, Fed. Rep. of Germany

[21] Appl. No.: 475,780

[22] Filed: Feb. 6, 1990

[30] Foreign Application Priority Data

Feb. 16, 1989 [DE] Fed. Rep. of Germany ....... 3904585

[51] Int. Cl.5 ............................................. F16F 9/36
[52] U.S. Cl. ............................. 188/322.16; 188/285; 267/64.22
[58] Field of Search .................. 188/285, 286, 322.16, 188/322.17, 322.18, 297, 300; 267/64.12, 64.22, 64.28; 248/562, 563, 636

[56] References Cited

U.S. PATENT DOCUMENTS

| | | | |
|---|---|---|---|
| 3,913,901 | 10/1975 | Molders | 188/300 X |
| 4,245,826 | 1/1981 | Wirges | 188/300 X |
| 4,386,766 | 7/1983 | Bauer et al. | 188/300 X |
| 4,632,371 | 12/1986 | Wirges et al. | 267/64.22 X |
| 4,728,084 | 3/1988 | Bauer et al. | 188/322.17 X |
| 4,793,451 | 12/1988 | Taylor | 188/322.17 X |

FOREIGN PATENT DOCUMENTS

| | | | |
|---|---|---|---|
| 2225342 | 10/1978 | Fed. Rep. of Germany . | |
| 2024749 | 8/1980 | Fed. Rep. of Germany . | |
| 2942455 | 4/1981 | Fed. Rep. of Germany . | |
| 2287628 | 5/1976 | France . | |
| 2586771 | 3/1987 | France | 188/300 |
| 2169685 | 7/1986 | United Kingdom . | |
| 2197708 | 5/1988 | United Kingdom | 188/300 |
| 8808090 | 10/1988 | World Int. Prop. O. | 188/322.17 |

Primary Examiner—Robert J. Oberleitner
Assistant Examiner—Alfred Muratori
Attorney, Agent, or Firm—Brumbaugh, Graves, Donohue & Raymond

[57] ABSTRACT

According to an illustrative example of the invention, a gas spring comprises a cylinder which is closed at both ends thereof. A piston is provided within the cylinder and separates two working chambers within the cylinder. The working chambers are filled with a pressurized gas. The piston is connected with a piston rod which extends axially through one end of the cylinder. The working chambers can be selectively connected or separated from each other through an axial channel extending through the piston. This axial channel accommodates a valve pin. The valve pin is axially movable by an actuating rod accommodated by an axial bore of the piston rod. The piston is in sealing engagement with an inner circumferential face of the cylinder. The valve pin is in sealing engagement with the channel. The piston is provided with an elastic covering layer, which covering layer provides both the sealing engagement of the piston with the cylinder and the sealing engagement of the valve pin with the piston.

55 Claims, 7 Drawing Sheets

FLUID FILLED CYLINDER PISTON DEVICE

BACKGROUND OF THE INVENTION

This invention relates to a cylinder piston device and more particularly to a gas spring. A cylinder piston device is composed of a plurality of components, namely a cylinder, terminal plugs for this cylinder, a piston plug within this cylinder, a piston rod connected with this piston plug and guided through at least one of the terminal plugs. Each of said terminal plugs and said piston plug may comprise a plurality of sealing locations. So, a terminal plug may comprise a sealing location for sealing engagement with a cylinder and a sealing location for a valve pin provided within a channel of the terminal plug. Further, the piston plug may be provided with a sealing location for the sealing engagement with an inner cylindrical face of the cylinder and a further sealing location for a valve pin accommodated within an axial channel of the piston plug.

STATEMENT OF THE PRIOR ART

In German patent 22 25 342, a gas spring comprises an inner cylinder member and an outer cylinder member. The cylinder members are coaxially arranged. At both ends of the cylinder members, a respective terminal plug is provided. A piston member is axially movable within the inner cylinder member. A piston rod is connected with the piston member. The piston rod extends through one of said terminal plugs. The piston member separates the cavity within the inner cylinder into two working chambers. The working chambers are interconnected through an annular space between the inner cylinder member and the outer cylinder member. One of the working chambers is interconnected with the annular space by a valve arrangement provided in the other terminal plug. Both terminal plugs are in sealing engagement with both cylinder members through separate sealing rings. The valve arrangement comprises further sealing rings between a valve pin and the respective terminal plug. A further sealing ring is provided on the piston member for sealing engagement with the inner cylindrical face of the inner cylinder member. The terminal plug passed by the piston rods provides a further sealing ring for sealing engagement with the piston rod.

In German patent 20 24 749, a cylinder piston device comprises a cylinder member and a piston member slidable therein. The piston member is connected with a piston rod sealingly guided through a terminal plug of the cylinder member. The cylinder member is provided with an axial valve channel accommodating a valve pin. The valve pin is in sealing engagement with the valve channel at two locations thereof. The piston member is therefore provided with a first sealing ring engagable with the inner cylinder face of the cylinder member and with a second sealing ring engageable with the valve pin. Moreover, the valve pin is provided with a third sealing ring engageable with a valve seat of the piston member.

OBJECT OF THE INVENTION

It is the object of the present invention to provide a cylinder piston device, in which assembly is facilitated by a reduced number of separate components.

SUMMARY OF THE INVENTION

A fluid filled cylinder piston device has an axis and is provided with a plug unit for confining at least one fluid chamber within the cylinder piston device. The plug unit is in sealing engagement with at least one and preferably at least two further components of the cylinder piston device through elastic sealing means. The plug unit comprises at least one basic plug body and at least one elastic covering layer at least partially covering the basic plug body. The elastic covering layer is in sealing engagement with said at least one and preferably at least two further components. As the elastic covering layer on the basic plug body provides at least one and preferably at least two sealing locations, the assembling of the cylinder piston device is facilitated.

The covering layer may have at least one contact face adhering to a respective contact face of the basic plug body. These contact faces may adhere to each other by chemical adhesion forces, e.g. said contact faces may adhere to each other by means of an adhesive. Additionally or alternatively, said contact faces may adhere to each other by mechanical micro-engagement of the covering layer into pores of the basic plug body, or vice versa. This micro-engagement can be easily obtained, if at least one of the basic plug body and the covering layer have a porous structure.

Alternatively or additionally, the covering layer may adhere to the basic plug body by engagement of the covering layer with at least two oppositely directed engagement faces of the basic plug body. In this case, one may talk of a mechanical macro-engagement.

The covering layer may be injection-molded onto the basic plug body from an elastic synthetic material, like polyamide or polyethylene or from a rubber-like material. In case of injection-molding, a mechanical micro-engagement between the contact faces may be obtained automatically, if the basic plug body has a porous structure, such as a structure obtained by the sintering of powder-like material, such a a metallic powder.

Alternatively, the covering layer may be made of a vulcanizable material and may be vulcanized onto the basic plug body. Vulcanization provides a kind of chemical adherence in the contact face. Additionally, also in case of vulcanization, a micro-engagement may be obtained, if the basic plug body has a porous structure.

It is very desirable to manufacture the basic plug body from powder-like material, e.g. by sintering. In this case, however, the plug body may be permeable to fluids and, more particularly, permeable to gases. Therefore, such a plug body could not be used in the piston in such cases, in which the plug body has to sealingly confine a fluid chamber and more particularly a gas filled chamber.

According to the present invention, the basic plug body may be permeable to the respective fluid, and the complete plug unit can be made impermeable with respect to the respective fluid by the covering layer.

According to one example of embodiment of the present invention, the plug unit is a terminal plug unit of a cylinder piston device provided adjacent an end portion of a cylindrical tube member. In this case, the covering layer may be in sealing engagement at least with the cylindrical tube member. In this case, the covering layer may comprise at least one terminal portion in contact with at least one substantially axially directed terminal face of the basic plug body and at least one external sleeve portion in contact with a substantially radially directed external circumferential face of the basic plug body. The external sleeve portion may be in sealing engagement with said substantially cylindrical tube member of the cylinder piston device. It is readily to be seen that in this case the covering layer may have the additional function of making the terminal plug unit impermeable to the respective fluid and more particularly to a pressurized gas.

The terminal plug unit may accommodate a valve unit with a substantially axially extending valve channel and a movable valve member therein. In this case, the valve member may be sealingly engageable within the covering layer in or adjacent the valve channel. It is easily to be recognized that in this case the covering layer can fulfill the function of at least two sealing locations and may additionally fulfill the function of preventing permeability of the terminal plug unit.

A preferred embodiment of a terminal plug unit incorporating a valve arrangement is such that the covering layer comprises at least a first terminal portion in contact with a substantially axially directed terminal face of the basic plug body. Further, the covering layer comprises at least a first external sleeve portion in contact with a radially outwardly directed circumferential face of the basic plug body. This external sleeve portion may be in sealing engagement with a first substantially cylindrical tube member. Further, the covering layer comprises at least a first internal sleeve portion in contact with a radially inwardly directed face of the valve channel. In this design, the movable valve member may be sealingly engageable with at least one of the first terminal portion and the first internal sleeve portion. The first terminal portion, said first external sleeve portion and said first internal sleeve portion may integrally cohere with each other. Preferably, the first terminal portion of said covering layer is adjacent to the fluid chamber within said tube member. This preferred embodiment may be further developed in that the covering layer comprises a second terminal portion in contact with a further substantially axially directed terminal face of said basic plug body remote from the fluid chamber. A second external sleeve portion may be in contact with a further substantially radially outwardly directed circumferential face of said basic plug body, and this second external sleeve portion may be in sealing engagement with a second substantially cylindrical tube member surrounding said first tube member. Finally, the covering layer may further comprise a second internal sleeve portion in contact with a further radially inwardly directed face of said valve channel. With such a design, the valve member may also be in sealing engagement with said second internal sleeve portion. The second external sleeve portion, the second terminal portion and the second internal sleeve portion may be integrally coherent with each other. Further, the first internal sleeve portion and the second internal sleeve portion may also be integrally coherent with each other. It is readily understandable that in such a design of a terminal plug unit, all sealing functions can be fulfilled by one covering layer which can be easily applied to the basic plug body in a respective mould.

It is possible that the total surface of the basic plug body is covered by the covering layer. It is preferable, however, that at least a small part of the surface of the basic plug body is uncovered, so that this uncovered surface area is available for centering the basic plug body within a mold during the application of the covering layer. It is to be noted that the covering layer may be obtained by usual application methods in its final shape ready for use within the respective cylinder piston device. It is also possible, however, to shape the covering layer only in a rough form by usual application techniques, such as injection-molding, and to thereafter obtain the final form by mechanical treatment, such as grinding.

Preferably, the basic plug body is uncovered by the covering layer within an axial section of a radially outwardly directed circumferential face axially between said first external sleeve portion and said second external sleeve portion. In this case, the basic plug body may be in direct engagement with at least one of said first and second tube members within said axial section.

The first and the second tube member being in sealing engagement with said covering layer may confine an annular conduit therebetween. This annular conduit may be connected through a passage within the basic plug body with the above-mentioned valve channel. This passage may open into the valve channel at a location axially between a first location of sealing engagement of said valve member with said covering layer and a second location of sealing engagement of said valve member with said covering layer. Such a valve chamber may be provided between said first and said second locations of sealing engagement, and said valve chamber may be connectable with said fluid chamber by movement of said valve member. With the aim of easily providing said passage, it may be preferable that the basic plug body is subdivided into two axially interconnected plug body parts along a separation plane substantially perpendicular to said axis. The passage may then be provided in or adjacent the separation place. E.g., the said passage may be substantially spiral about said axis and may be provided in a passage plate sandwiched between said two plug body parts.

The plug unit of the present invention may also be a separating piston within a substantially cylindrical tube member of the cylinder piston device, such as to separate two axially adjacent fluid chambers within the tube member. In this case, the basic plug body is connected with a piston rod member axially extending through at least one end of said cylinder piston device. The piston rod member is axially movable with respect to the tube member. The basic plug body comprises an axially extending valve channel for selectively connecting and separating said two fluid chambers. The valve channel receives a valve member. The covering layer provides first sealing means engageable with an inner cylindrical surface of the tube member and second sealing means for sealing engagement with the valve member.

Thus, a separating piston is obtained, in which all sealing functions are fullfilled by one covering layer. Thus, the covering layer may comprise a terminal portion in contact with a substantially axially directed terminal face of the basic plug body, an external sleeve portion in contact with a radially outwardly directed circumferential face of the basic plug body and an internal sleeve portion in contact with a radially inwardly directed contact face of the valve channel. The external sleeve portion is then in sealing engagement with an internal wall surface of the tube member, and the valve member is also in sealing engagement with the covering layer in at least one sealing engagement location. If the valve member is in sealing engagement with the covering layer in at least two axially spaced sealing engagement locations, a valve chamber is defined within the valve channel. This valve chamber may be connected with one of the fluid chambers. Moreover, the valve chamber may be connectable with the other one of said fluid chambers by movement of said valve member with respect to the basic plug body. For actuation of the valve member, the piston rod member may have an axial bore, and this axial bore may receive a valve member actuating rod.

According to a further embodiment of the invention, a terminal plug unit may have an axial bore receiving a piston rod member of the cylinder piston device. In this case, the covering layer may be in sealing engagement with both a cylindrical tube member and a piston rod member of the cylinder piston device.

In all embodiments of the invention, the sealing engagement of the elastic covering layer with said at least one further component may be provided by a plurality of sealing beads of said covering layer. These sealing beads may form an undulated sealing profile.

The cylinder piston device may be a gas spring, in which case it comprises at least one volume of pressurized gas. The cylinder piston device may also be an oscillation damper or a hydraulic or pneumatic actuating device.

The various features of novelty which characterize the invention are pointed out with particularly in the claims annexed to and forming a pair of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENTS

Figure 1:
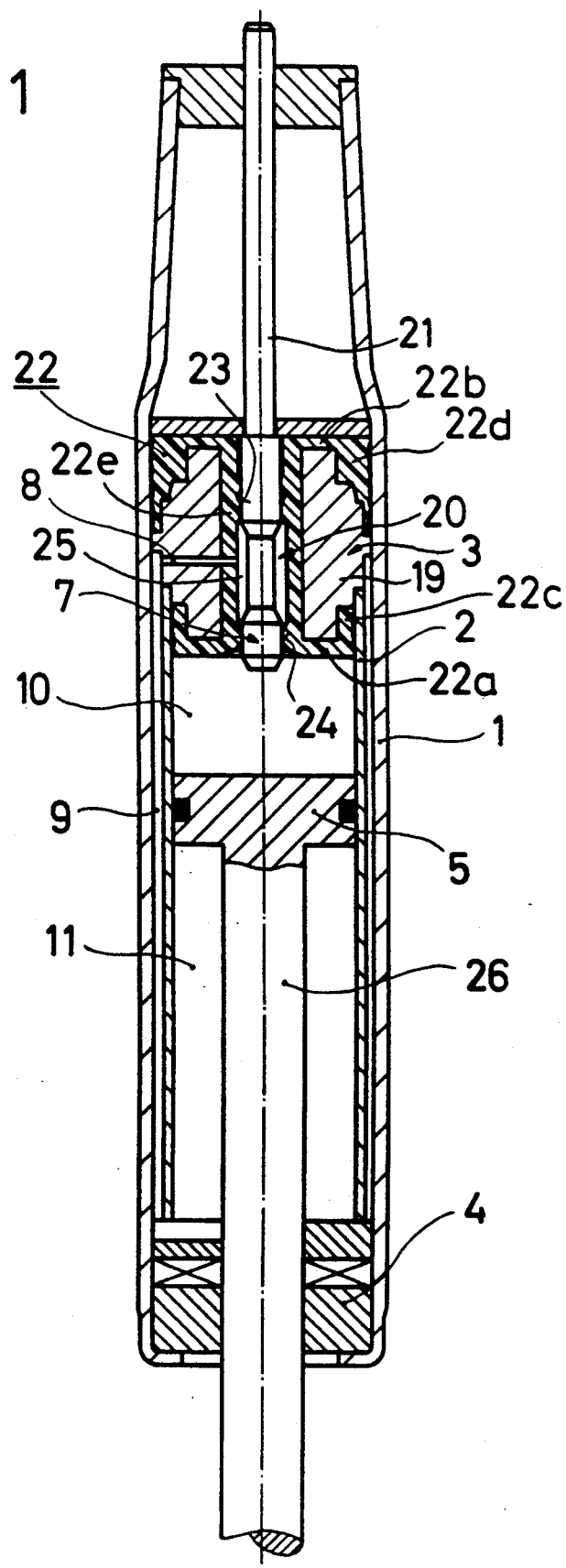
FIG. 1 shows a longitudinal section through a gas spring with a terminal plug unit according to this invention.

The gas spring comprises an inner tube 2 and an outer tube 1. A cavity 10,11 is confined within the inner tube 2 by a terminal plug unit 3 and a piston rod sealing and guiding unit 4. A separating piston 5 is slidable within the cavity 10,11 and separates the cavity 10,11 into two working chambers 10 and 11. The working chambers 10 and 11 are interconnected by an annular space 9 between the cylinder members 1 and 2, a passage 8 and a valve channel 20 extending axially through the terminal plug unit 3. The valve channel 20 accommodates a valve pin 7, which is axially movable through an actuating rod 21. The working chambers 10 and 11 are filled with a pressurized gas. The terminal plug unit 3 consists of a basic plug body 19, which is covered with a covering layer 22 of elastic material. This covering layer 22 comprises a first terminal portion $22a$, a second terminal portion $22b$, a first external sleeve portion $22c$, a second external sleeve portion $22d$ and an internal sleeve portion $22e$. All portions $22a$ to $22e$ of the covering layer are integrally coherent.

The external sleeve portion $22d$ is in sealing engagement with the outer tube member 1. The external sleeve portion $22c$ is in sealing engagement with the inner tube member 2. The valve pin 7 is in continuous sealing engagement with the internal sleeve portion $22e$ at the sealing location 23 and is sealingly engageable with the inner sleeve portion $22e$ at the location 24. At both locations, the sealing function is fulfilled by the material of the covering layer 22. The valve pin 7 is biased towards the position as shown in FIG. 1 by the gas pressure within the working chamber 10. By axial movement of the valve pin 7 through the actuating rod 21 the sealing pin 7 can be shifted with respect to the sealing location 24 so that the valve chamber 25 defined between the sealing locations 23 and 24 is opened towards the working chamber 10. Thus, the working chambers 10 and 11 are interconnected by the annular space 9, the passage 8 and the valve chamber 25. Now, the piston rod 26 connected with the separating piston 5 can be moved with respect to the inner tube member 2. Outward movement of the piston rod 26 is supported by the gas pressure within the working chambers 10 and 11.

Figure 2:
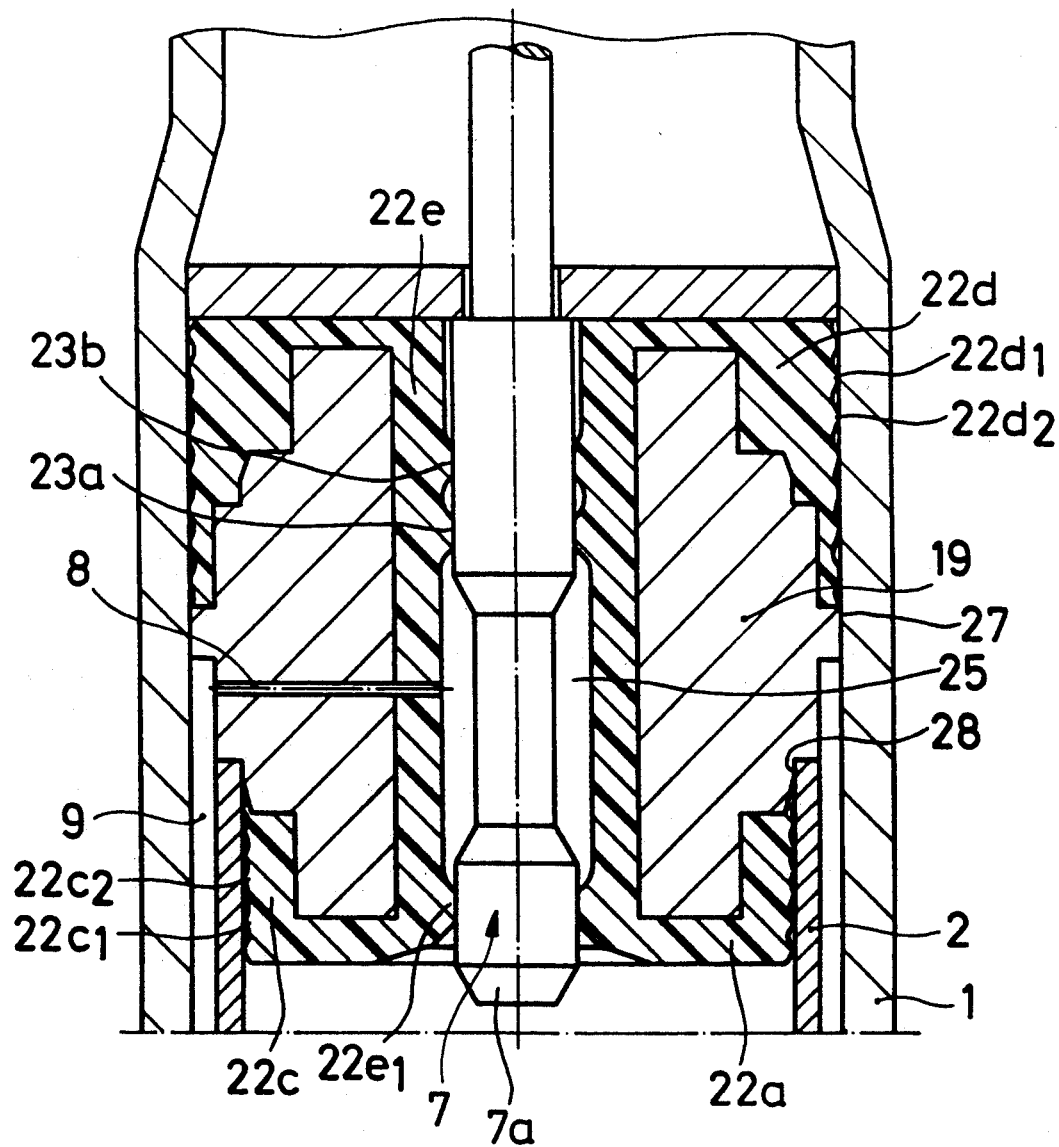
FIG. 2 shows an enlarged section through the terminal plug unit of FIG. 1.

Some more details of the terminal plug unit are shown in FIG. 2. One recognizes that the basic plug body 19 has an uncovered circumferential face 27 engaging the outer tube member 1 and a further uncovered face 28 engaging the inner tube member 2. One further recognizes that the sealing location 23 is established by a plurality of sealing beads $23a$ and $23b$. In a similar way, the sealing engagement between the external sleeve portion $22d$ and the outer tube member 1 comprises a plurality of sealing beads $22d_1$ and $22d_2$ engaging the outer tube member 1. Moreover, the external sleeve portion $22c$ comprises a plurality of sealing beads $22c_1$ and $22c_2$ sealingly engaging the inner tube member 2. The enlarged lower portion $7a$ of the valve pin 7 engages a radially inwardly projecting sealing bead $22e_1$ of the internal sleeve portion $22e$.

Figure 3:
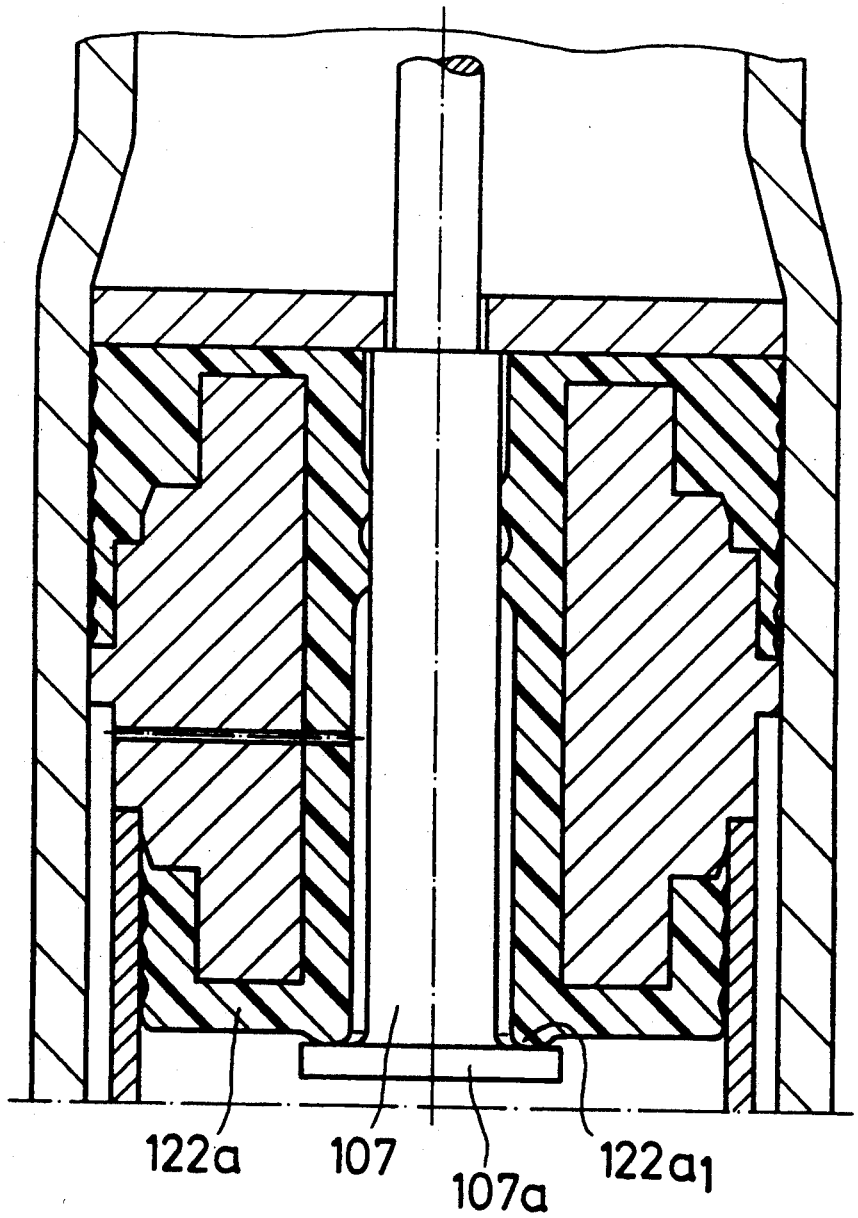
FIG. 3 shows a further embodiment of the terminal plug unit with a modified valve member.

The embodiment of FIG. 3 differs from the embodiment of FIG. 2 only in that the valve pin 107 is provided with a valve plate $107a$ sealingly engageable with an axially downwardly projecting sealing bead $122a_1$ of the terminal portion $122a$.

Figure 4:
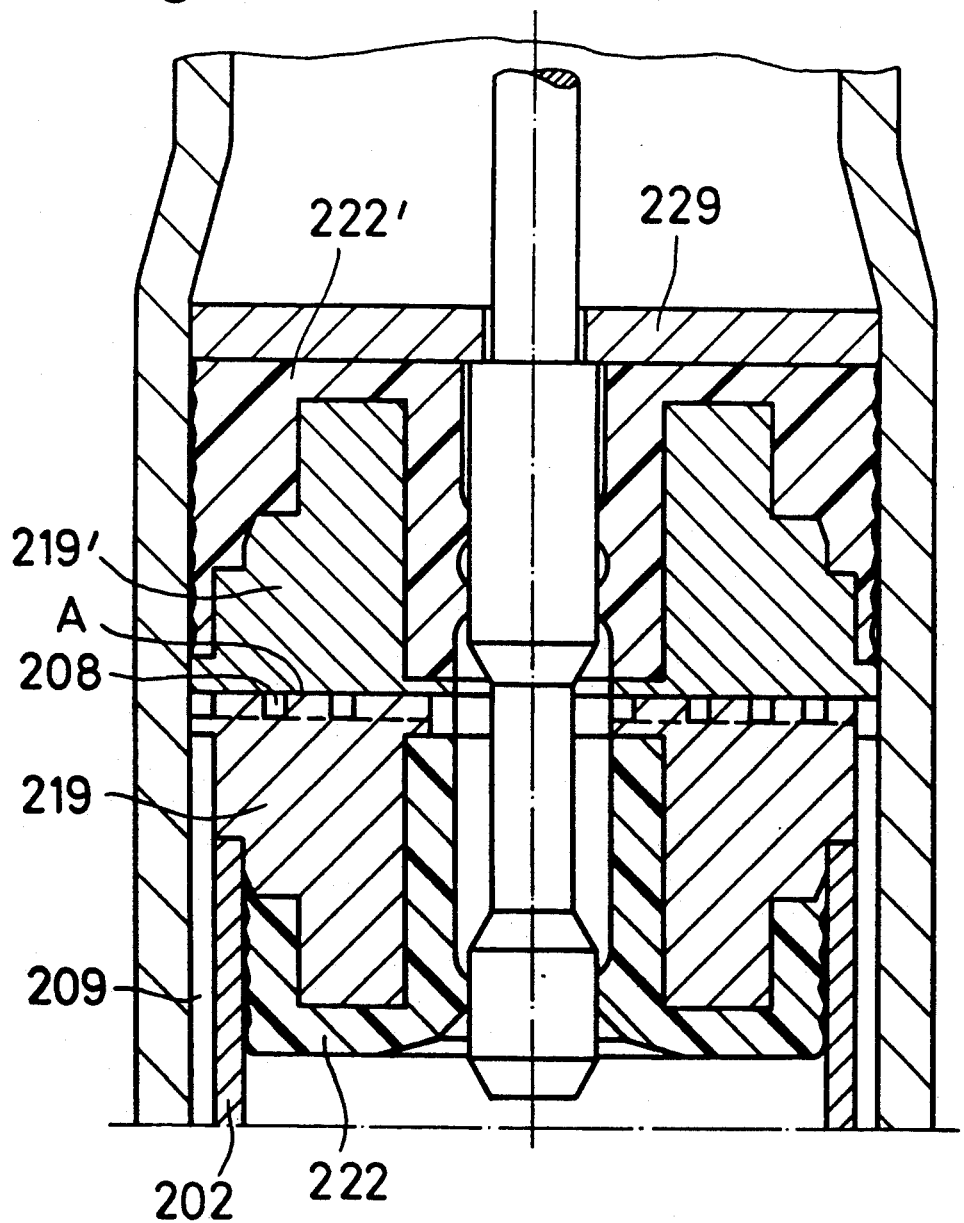
FIG. 4 shows a further modification of a terminal plug unit with a basic plug body composed of two plug body parts.

The embodiment of FIG. 4 differs from the before described embodiments in that the basic plug body is composed of two plug body parts 219 and 219' the passage 208 being provided in a separating plane A between the plug body parts 219 and 219'. In this case, the covering layer consists of two parts 222 and 222' provided on the respective plug body parts 219 and 219'. The plug body parts 219 and 219' are pressed together between an abutment plate 229 and the upper end of the inner tube member 202.

Figure 5:
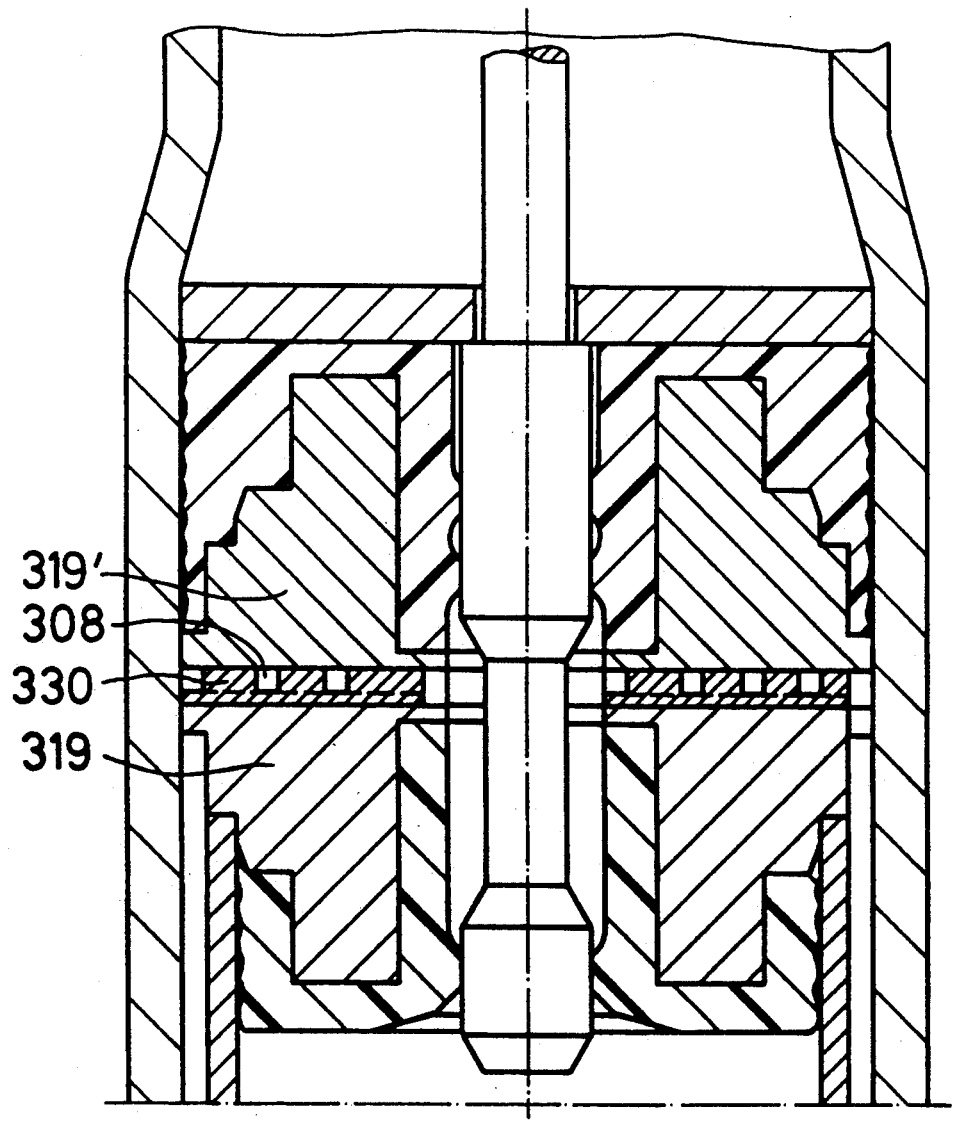
FIG. 5 shows a further embodiment of the invention with a passage plate being sandwiched between two plug body parts.

In the embodiment of FIG. 5, the plug body parts 319 and 319' are sandwiched with a passage plate 330 in which the spiral passage 308 is shaped.

Figure 6:
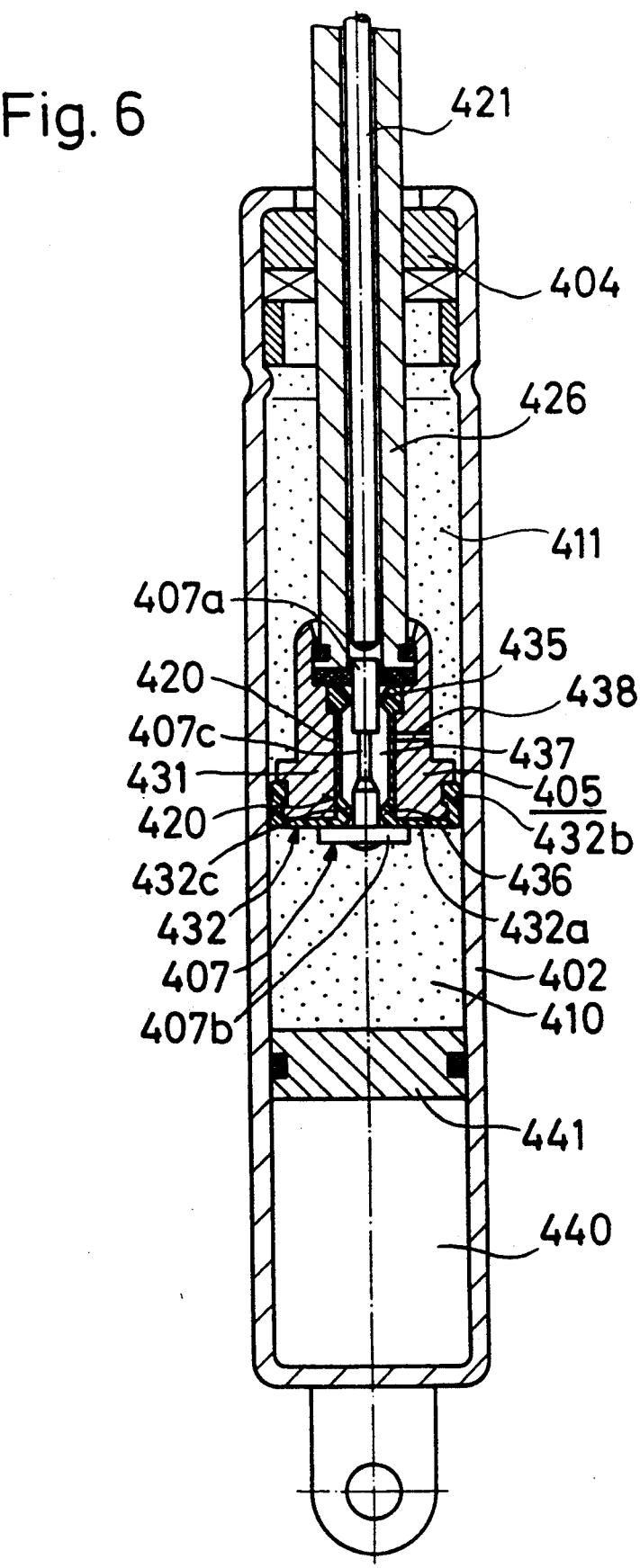
FIG. 6 shows a longitudinal section through a further type of gas spring with a separating piston according to the principles of the present invention.

In the embodiment of FIG. 6, a separating piston 405 consists of a basic plug body 431 and an elastic covering layer 432. This elastic covering layer 432 comprises a terminal portion 432a, an external sleeve portion 432b and an internal sleeve portion 432c. The external sleeve portion 432b is in sealing engagement with an inner circumferential face of the tube member 402. The internal sleeve portion 432c covers an axial valve channel 420. A valve member 407 is provided within the valve channel 420. This valve member 407 comprises a valve shaft 407a and an abutment plate 407b. The valve shaft 407a is in sealing engagement with the internal sleeve portion 432c at sealing engagement locations 435 and 436. At both sealing locations 435 and 436, the internal sleeve portion 432c is provided with radially inwardly directed sealing beads made of the material of the elastic covering layer. A valve chamber 437 is defined within the internal sleeve portion 432c between the sealing engagement locations 435 and 436. This valve chamber 437 is connected through a radial bore 438 of the basic plug body 431 with a working chamber 411. The working chamber 411 is connectable with a further chamber 410 by downward movement of the valve member 407 by means of an actuating rod 421. On such downward movement, a section 407c of the valve shaft 407a crosses the sealing bead 436 so that fluid can flow between the working chambers 410 and 411. The working chambers 410 and 411 are filled with a liquid. A further chamber 440 is filled with a pressurized gas. The chamber 440 is separated from the working chamber 410 by the floating separating wall 441. The piston rod 426 passes through a guiding and sealing unit 404 at the upper end of the cylinder 402. The piston rod 421 is mechanically connected with the basic plug body 431.

Figure 7:
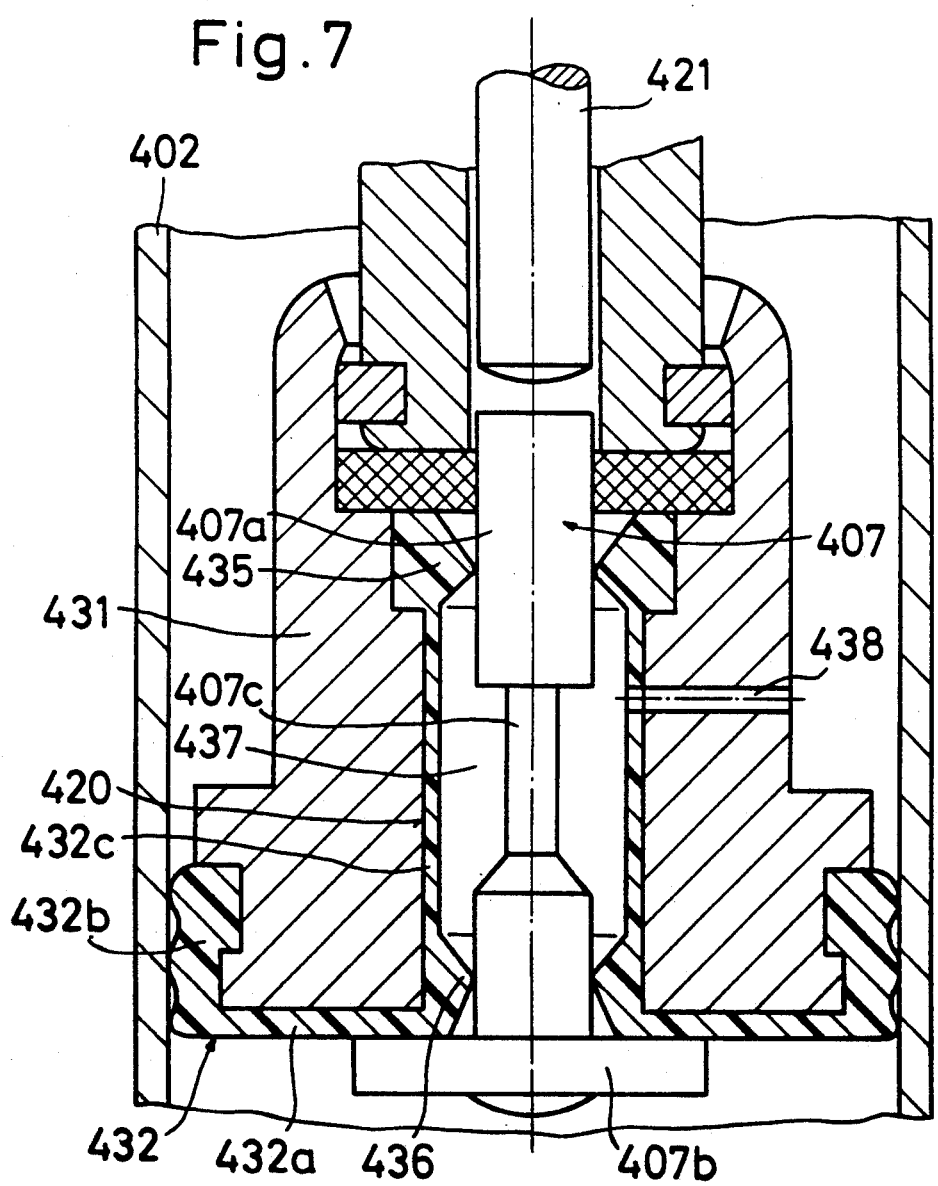
FIG. 7 shows an enlarged section through the separating piston of FIG. 6.

More details of the separating piston can be seen from FIG. 7.

Figure 8:
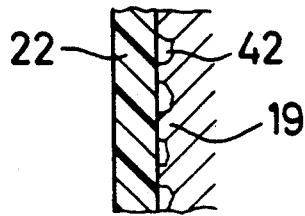
FIG. 8 shows an enlarged section through a contact face between a basic plug body and a covering layer and FIG. 9 shows a partial longitudinal section through a gas spring comprising a terminal plug unit with a piston rod passing therethrough.

In FIG. 8, one recognizes a basic plug body 19 in micro-engagement with a covering layer 22, the covering layer 22 enters into pores 42 of the basic plug body 19.

Figure 9:
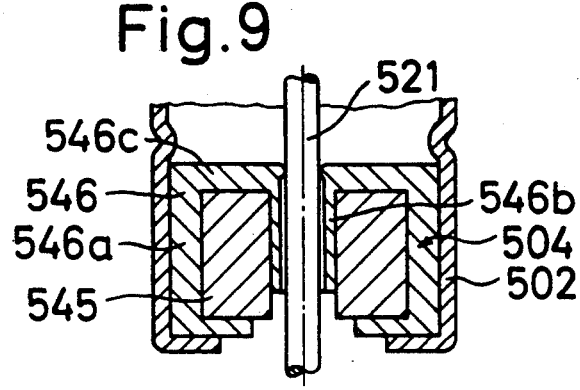

In FIG. 9, a piston rod 521 passes through a sealing and guiding unit 504 of a cylinder 502. The sealing and guiding unit 504 consists of a basic plug body 545 and a covering layer 546. An external sleeve portion 546a of the covering layer is in sealing engagement with the tube member 502, and an internal sleeve portion 546 is in sealing engagement with the piston rod 521. The sleeve portions 546a and 546b are integrally coherent through a terminal portion 546c.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

The covering layer may also be prefabricated before being assembled with the basic plug body. This is particularly true for the embodiment of FIG. 4.

We claim:

1. A fluid filled cylinder piston device comprising:
at least one cylindrical tube member (1, 2, 502) having an axis;
a piston rod member (26, 521) extending axially through at least one end of said cylindrical tube member (1, 2, 502);
plug unit means (3, 504; 19, 545; 22, 546) surrounded at least in part by said cylindrical tube member (1, 2, 502) for confining at least one fluid chamber (10, 11) within said cylindrical tube member (1, 2, 502); and
a volume of pressurized gas in said at least one fluid chamber (10, 11);
a movable member (7, 521) extending axially through an axial passage (20) in said plug unit means (3, 504; 19, 545; 22, 546);
said plug unit means (3, 504; 19, 545; 22, 546) comprising at least one basic plug body (19, 545) having an external surface and a bore with an internal circumferential face, and further comprising an elastic covering layer (22, 546) at least partially covering said external surface and said internal circumferential face,
said passage being at least partially confined within said bore by said elastic covering layer (22, 546),
said elastic covering layer (22, 546) being in sealing engagement with said cylindrical tube member (1, 2, 502) and in direct sealing contact with said movable member (7, 521), whereby said movable member (7, 521) is sealed without additional sealing elements.

2. A cylinder piston device as set forth in claim 1, said covering layer (22) having at least one contact face adhering to a respective contact face of said basic plug body (19).

3. A cylinder piston device as set forth in claim 2, said contact faces adhering to each other by chemical adhesion forces.

4. A cylinder piston device as set forth in claim 3, said contact faces adhering to each other by means of an adhesive.

5. A cylinder piston device as set forth in claim 2, said contact faces adhering to each other by mechanical micro-engagement of said covering layer (22) into pores of said basic plug body (19), or vice versa.

6. A cylinder piston device as set forth in claim 1, said covering layer (22) being injection-molded onto said basic plug body (19).

7. A cylinder piston device as set forth in claim 1, said covering layer (22) being made of a vulcanizable material and being vulcanized onto said basic plug body (19).

8. A cylinder piston device as set forth in claim 1, said basic plug body (19) being permeable to fluid when uncovered, said plug unit (3) being made impermeable with respect to said at least one fluid chamber (10,11) by said at least one covering layer (22).

9. A fluid filled cylinder piston device as claimed in claim 1,
said sealing engagement of said elastic covering layer (22) with one of said cylindrical tube member (1, 2) and said movable member being provided by a plurality of annular sealing beads (22d_1, 22d_2; 22c_1; 22c_2, 23a, 23b) of said elastic covering layer (22).

10. A cylinder piston device as set forth in claim 9, said sealing beads (22d_1, 22d_2; 22c_1, 22c_2; 23a, 23b) forming an undulated sealing profile.

11. A fluid filled cylinder piston device comprising:
at least one cylindrical tube member (1, 2, 502) having an axis;

a piston rod member (26, 521) extending axially through at least one end of said cylindrical tube member (1, 2, 502); and plug unit means (3, 504; 19, 545; 22, 546) surrounded at least in part by said cylindrical tube member (1, 2, 502) for confining at least one fluid chamber (10, 11) within said cylindrical tube member (1, 2, 502);

a movable member (7, 521) extending axially through an axial passage (20) in said plug unit means (3, 504; 19, 545; 22, 546);

said plug unit means (3, 504; 19, 545; 22, 546) comprising at least one basic plug body (19, 545) having an external surface and a bore with an internal circumferential face, and further comprising an elastic covering layer (22, 546) at least partially covering said external surface and said internal circumferential face and adhering to said basic plug body (19, 545) by engagement of said elastic covering layer (22, 546) with at least two oppositely directed engagement faces of said basic plug body (19, 545), said passage (20) being at least partially confined within said bore by said elastic covering layer, said elastic covering layer (22, 546) being in sealing engagement with said cylindrical tube member (1, 2, 502) and in direct sealing contact with said movable member (7, 521), whereby said movable member is sealed without additional sealing elements.

12. A fluid filled cylinder piston device comprising:
at least a first cylindrical tube member (1, 2, 502) having an axis;

a piston rod member (26, 521) extending axially through at least one end of said cylindrical tube member (1, 2, 502); and plug unit means (3, 504; 19, 545; 22, 546) provided adjacent an end portion of said cylindrical tube member (1, 2, 502) and surrounded at least in part by said cylindrical tube member (1, 2, 502) for confining at least one fluid chamber (10, 11) within said cylindrical tube member (1, 2, 502);

a movable member (7, 521) extending axially through a passage (20) in said plug unit means (3, 504; 19, 545; 22, 546);

said plug unit means (3, 504; 19, 545; 22, 546) comprising at least one basic plug body (19, 545) having an external surface and a bore with an internal circumferential face, and further comprising an elastic layer (22, 546) at least partially covering said external surface and said internal circumferential face, said passage being at least partially confined within said bore by said elastic covering layer, said elastic covering layer (22, 546) being in sealing engagement with said cylindrical tube member (1, 2, 502) and in direct sealing contact with said movable member (7, 521), whereby said movable member (7, 521) is sealed without additional sealing elements;

said elastic covering layer (22, 546) comprising at least one terminal portion (22a, 22b, 546c) in contact with at least one substantially axially directed terminal face of said external surface and at least one external sleeve portion (22c, 22d, 546a) in contact with a substantially radially directed external circumferential face of said external surface, said external sleeve portion (22c, 22d, 546a) being in sealing engagement with said cylindrical tube member (1, 2, 502) of said cylinder piston device.

13. A cylinder piston device as set forth in claim 12 wherein said passage (20) comprises a valve channel and said movable member (7) comprises a valve member.

14. A cylinder piston device as set forth in claim 13 wherein said elastic covering layer (22) further includes at least a first internal sleeve portion (22e) in contact with said internal circumferential face of said bore, and said valve member (7) is sealingly engageable with at least one of said terminal portion (22a) and said first internal sleeve portion (22e).

15. A cylinder piston device as set forth in claim 14, said first terminal portion (22a) of said covering layer (22) being adjacent to said fluid chamber (10,11) within said cylindrical tube member (1,2).

16. A cylinder piston device as set forth in claim 15, further comprising a second cylindrical tube member (1) surrounding said at least one cylindrical tube member (2), and wherein said elastic covering layer (22) comprises
a second terminal portion (22b) in contact with a further substantially axially directed terminal face of said external surface remote from said fluid chamber (10, 11),
a second external sleeve portion (22d) in contact with a further substantially radially outwardly directed circumferentially face of said external surface and in sealing engagement with said second cylindrical tube member (1), and
a second internal sleeve portion (22e) in contact with said internal circumferential face of said bore,
said valve member (7) being in sealing engagement with said second internal sleeve portion (22e).

17. A cylinder piston device as set forth in claim 16, said second external sleeve portion (22d), said second terminal portion (22b) and said second internal sleeve portion (22e) being integrally coherent.

18. A cylinder piston device as set forth in claim 17, said first internal sleeve portion (22e) and said second internal sleeve portion (22e) being integrally coherent.

19. A cylinder piston device as set forth in claim 16, said basic plug body (19) being uncovered by said covering layer (22) within an axial section of a radially outwardly directed circumferential face (27,28) axially between said external sleeve portion (22c) and said second external sleeve portion (22d).

20. A cylinder piston device as set forth in claim 19, said basic plug body (19) being in engagement with at least one of said first and second cylindrical tube members (1,2) within said axial section.

21. A cylinder piston device as set forth in claim 16, said first cylindrical tube member (2) and said second cylindrical tube member (1) being in sealing engagement with said covering layer (22) and confining an annular conduit (9) therebetween, said annular conduit (9) being connected through a passage (8) within said basic plug body (19) with said valve channel (20), said passage (8) opening into said valve channel (20) at a location axially between a first location of sealing engagement of said valve member (7) with said covering layer (22) and a second location (23) of sealing engagement of said valve member (7) with said covering layer (22), a valve chamber (25) being provided between said first and said second locations (24,23) of sealing engagement, said valve chamber (25) being connectable with said fluid chamber (10) by movement of said valve member (7).

22. A cylinder piston device as set forth in claim 21, said basic plug body (19) being subdivided into two axially interconnected plug body parts (219,219') along a separation plane substantially perpendicular to said axis, said passage (208) being provided in or adjacent said separation plane.

23. A cylinder piston device as set forth in claim 22, said passage (208) being substantially spiral about said axis.

24. A cylinder piston device as set forth in claim 22 or 23, said passage (308) being provided in a passage plate (330) sandwiched between said two plug body parts (319,319').

25. A cylinder piston device as set forth in claim 21, said basic plug body (19) being subdivided into two axially interconnected plug body parts (219, 219') along a separation plane substantially perpendicular to said axis, said passage (208) being provided in or adjacent said separation plane.

26. A cylinder piston device as set forth in claim 25, said passage (208) being substantially spiral about said axis.

27. A cylinder piston device as set forth in claim 25 or 26, said passage (308) being provided in a passage plate (330) sandwiched between said two plug body parts (319, 319').

28. A cylinder piston device as set forth in claim 14, said first terminal portion (22a), said first external sleeve portion (22c) and said first internal sleeve portion (22e) being integrally cohering with each other.

29. A fluid filled cylinder piston device as claimed in claim 12, said at least one terminal portion (22b) being covered by an annular guiding member centered through said cylindrical tube member (1), said movable member (7) being axially guided by said annular guiding member.

30. A fluid filled cylinder piston device comprising:
at least one cylindrical tube member (402) having an axis;
a piston rod member (426) extending axially through at least one end of said cylindrical tube member (402) and being axially movable with respect to said cylindrical tube member (402);
plug unit means (405) connected to said piston rod member (426) within said cylindrical tube member (402) defining a separating piston (405) for separating two axially adjacent fluid chambers (410, 411) within said cylindrical tube member (402), said plug unit means (405) including means defining an axially extending valve channel (420) therein for selectively connecting and separating said two fluid chambers (410, 411); and
an axially movable valve member (407) located in said valve channel (420);
said plug unit means (405) comprising at least one basic plug body (431) having an external surface and a bore with an internal circumferential face, and further comprising an elastic covering layer (432) at least partially covering said external surface and said internal circumferential face, said valve channel (420) being at least partially confined within said bore by said elastic covering layer,
said elastic covering layer (432) including first sealing means for sealing engagement with an inner cylindrical surface of said cylindrical tube member (402) and second sealing means for sealing engagement with said axially movable valve member (407), whereby said axially movable valve member (407) is sealed without additional sealing elements.

31. A cylinder piston device as set forth in claim 30, said elastic covering layer (432) comprising a terminal portion (432a) in contact with a substantially axially directed terminal face of said basic plug body (431), an external sleeve portion (432b) in contact with a radially outwardly directed circumferential face of said basic plug body (431), and an internal sleeve portion (432c) in contact with said internal circumferential face of said bore,
said external sleeve portion (432b) being in sealing engagement with an internal wall surface of said tube member (402), and said axially movable valve member (407) being in sealing engagement with said elastic covering layer (432) in at least one sealing engagement location (436, 435).

32. A cylinder piston device as set forth in claim 30 or 31, said valve member (407) being engageable in sealing engagement with said covering layer (432) in at least two axially spaced sealing engagement locations (435, 436) so as to define a valve chamber (437) within said valve channel (420), said valve chamber (437 being connected with one (411) of said fluid chambers (411,410), said valve chamber (437) being connectable with the other one (410) of said fluid chambers (410,411) by movement of said valve member (407) with respect to said basic plug body (431).

33. A cylinder piston device as set forth in claim 30, said piston rod member (426) having an axial bore, said axial bore receiving a valve member actuating rod (421).

34. A fluid filled cylinder piston device comprising:
at least one cylindrical tube member (502) having an axis;
a piston rod member (521) extending axially through at least one end of said cylindrical tube member (502);
plug unit means (504) provided adjacent said one end of said cylindrical tube member (502) and surrounded at least in part by said cylindrical tube member (502) for confining at least one fluid chamber within said cylindrical tube member (502); and
said plug unit means (504) comprising at least one basic plug body (545) having an external surface and a bore with an internal circumferential face, and further comprising an elastic covering layer (546) at least partially covering said external surface and said internal circumferential face;
a piston rod passage being at least partially confined within said bore by said elastic covering layer (546);
said elastic covering layer (546) being in sealing engagement with said cylindrical tube member (502) and in direct sealing contact with said piston rod member (521), whereby said piston rod member (521) is sealed without additional sealing elements.

35. A fluid filled cylinder piston device comprising:
at least one cylindrical tube member (1, 2, 502) having an axis;
a piston rod member (26, 521) extending axially through at least one end of said cylindrical tube member (1, 2, 502);
plug unit means (3, 504; 19, 545; 22, 546) surrounded at least in part by said cylindrical tube member (1, 2, 502) for confining at least one fluid chamber (10, 11) within said cylindrical tube member (1, 2, 502); and
a volume of fluid in said at least one fluid chamber (10, 11);

a movable member (7, 521) extending axially through an axial passage (20) in said plug unit means (3, 504; 19, 545; 22, 546);

said plug unit means (3, 504; 19, 545; 22, 546) comprising at least one basic plug body (19, 545) having an external surface and a bore with an internal circumferential face, and further comprising an elastic covering layer (22, 546) at least partially covering said external surface and said internal circumferential face, said passage being at least partially confined within said bore by said elastic covering layer, said elastic covering layer (22, 546) being in sealing engagement with said cylindrical tube member (1, 2, 502) and in direct sealing contact with said movable member (7, 521), whereby said movable member (7, 521) is sealed without additional sealing elements.

36. A fluid filled cylinder piston device comprising:

at least one cylinder tube member (402) having an axis;

a piston rod member (426) extending axially through at least one end of said cylindrical tube member (402) and being axially movable with respect to said cylindrical tube member (402);

plug unit means (405, 431, 432) connected to said piston rod member (426) within said cylindrical tube member (402) defining a separating piston (405) for separating two axially adjacent fluid chambers (410, 411) within said cylindrical tube member (402), said plug unit means (405) including means defining an axially extending valve channel (420) therein for selectively connecting and separating said two fluid chambers (410, 411); and an axially movable member (407) located in said valve channel (420);

said plug unit means (405) comprising at least one basic plug body (431) having an external surface and a bore with an internal circumferential face, and further comprising an elastic covering layer (432) at least partially covering said external surface and said internal circumferential face;

said valve channel (420) being at least partially confined within said bore by said elastic covering layer;

said elastic covering layer (432) including first sealing means for sealing engagement with an inner cylindrical surface of said cylindrical tube member (402) and second sealing means for sealing engagement with said movable valve member (407);

said elastic covering layer (432) comprising a terminal portion (432a) in contact with a substantially axially directed terminal face of said basic plug body (431), an external sleeve portion (432b) in contact with a radially outwardly directed circumferential face of said basic plug body (431) and an internal sleeve portion (432c) in contact with said internal circumferential face of said bore;

said external sleeve portion (432b) being in sealing engagement with an internal wall surface of said tube member (402);

said valve member (407) being in sealing engagement with said elastic covering layer (432) in at least one sealing engagement location (436, 435), said plug body (431) having first and second annular engagement shoulders, said external sleeve portion (432b) of said elastic covering layer (432) being engaged at said first annular engagement shoulder, and said internal sleeve portion (432c) of said elastic covering layer (432) being engaged at said second annular engagement shoulder.

37. A fluid filled cylinder piston device comprising:

a first cylindrical tube member (2) having an axis;

a piston rod member (26) extending axially through at least one end of said first cylindrical tube member (2);

plug unit means (3, 19, 22) provided adjacent an end portion of said first cylindrical tube member (2) and surrounded at least on part by said first cylindrical tube member (2) for confining at least one fluid chamber (10, 11) within said first cylindrical tube member (2); and a movable member (7) extending axially through a bore (20) in said plug unit means (3, 19, 22);

said plug unit means (3, 19, 22) comprising at least one basic plug body (19) with said bore (20) and at least one elastic covering layer (22) at least partially covering said basic plug body (19);

said at least one elastic covering layer (22) comprising a first terminal portion (22a) in contact with an axially directed terminal face of said basic plug body (19) and a first external sleeve portion (22c) in contact with a substantially radially directed external circumferential face of said basic plug body (19), said first external sleeve portion (22c) being in sealing engagement with said first cylindrical tube member (2) of said cylinder piston device, said bore (20) comprising a valve channel and said movable member (7) comprising a valve member, said at least one elastic covering layer (22) further including a first internal sleeve portion (22e) in contact with a radially inwardly directed face portion of said bore (20), said first terminal portion (22a) of said at least one elastic covering layer (22) being adjacent to said fluid chamber (10, 11) within said cylindrical tube member (2), said cylinder piston device further comprising a second cylindrical tube member (1) surrounding said first cylindrical tube member (2), said at least one elastic covering layer (22) comprising a second terminal portion (22b) in contact with a further substantially axially directed terminal face of said basic plug body (19) remote from said fluid chamber (10, 11), a second external sleeve portion (22d) in contact with a further substantially radially outwardly directed circumferential face of said basic plug body (19) and in sealing engagement with said second cylindrical tube member (1), and a second internal sleeve portion (22e) in contact with a further radially inwardly directed face portion of said bore (20), said valve member (7) being sealingly engageable with at least one of said first terminal portion (22a), said first internal sleeve portion (22e), and said second internal sleeve portion (22e).

38. A cylinder piston device as set forth in claim 37, said second external sleeve portion (22d) said second terminal portion (22b) and said second internal sleeve portion (22e) being integrally coherent.

39. A cylinder piston device as set forth in claim 38, said first internal sleeve portion (22e) and said second internal sleeve portion (22e₁) being integrally coherent.

40. A cylinder piston device as set forth in claim 37, said basic plug body (19) being uncovered by said at least one elastic covering layer (22) within an axial section of a radially outwardly directed circumferential face (27, 28) axially between said first external sleeve portion (22c) and said second external sleeve portion (22d).

41. A cylinder piston device as set forth in claim 40, said basic plug body (19) being in engagement with at least one of said first and second tube members (2, 1) within said axial section.

42. A cylinder piston device as set forth in claim 37, said first tube member (2) and said second tube member (1) being in sealing engagement with said at least one elastic covering layer (22) and confining an annular conduit (9) therebetween,
   said annular conduit (9) being connected through a passage (8) within said basic plug body (19) with said bore (20),
   said passage (8) opening into said bore (20) at a location (24) axially between a first location of sealing engagement of said valve member (7) with said at least one elastic covering layer (22) and a second location (23) of sealing engagement of said valve member (7) with said at least one elastic covering layer (22),
   a valve chamber (25) being provided between said first and said second locations (24, 23) of sealing engagement, said valve chamber (25) being connectable with said fluid chamber (10) by movement of said valve member (7).

43. A cylinder piston device as set forth in claim 37, said at least one elastic covering layer (22) having at least one contact face adhering to a respective contact face of said basic plug body (19).

44. A cylinder piston device as set forth in claim 43, said contact faces adhering to each other by chemical adhesion forces.

45. A cylinder piston device as set forth in claim 44, said contact faces adhering to each other by means of an adhesive.

46. A cylinder piston device as set forth in claim 43, said contact faces adhering to each other by mechanical micro-engagement of said at least one elastic covering layer (22) into pores of said basic plug body (19).

47. A cylinder piston device as set forth in claim 43, said contact faces adhering to each other by mechanical micro-engagement of said basic plug body (19) into pores of said at least one elastic covering layer (22).

48. A cylinder piston device as set forth in claim 37, said at least one elastic covering layer (22) being injection-molded onto said basic plug body (19).

49. A cylinder piston device as set forth in claim 37, said at least one elastic covering layer (22) being made of a vulcanizable material and being vulcanized onto said basic plug body (19).

50. A cylinder piston device as set forth in claim 37, said basic plug body (19) being permeable to fluid when uncovered, said plug unit (3, 19, 22) being made impermeable with respect to said at least one fluid chamber (10, 11) by said at least one elastic covering layer (22).

51. A cylinder piston device as set forth in claim 37, said first terminal portion (22a), said first external sleeve portion (22c) and said first internal sleeve portion (22e) being integrally cohering with each other.

52. A cylinder piston device as set forth in claim 37, said sealing engagement of said at least one elastic covering layer (22) with at least one of said cylindrical tube members (2, 1) and said movable member (7) being provided by a plurality of annular sealing beads ($22d_1$, $22d_2$; $22c_1$; $22c_2$; $23a$, $23b$) of said at least one elastic covering layer (22).

53. A cylinder piston device as set forth in claim 37, containing a volume of pressurized gas.

54. A cylinder piston device as set forth in claim 37, said sealing beads ($22d_1$, $22d_2$; $22c_1$; $22c_2$; $23a$, $23b$) forming an undulated sealing profile.

55. A cylinder piston device as set forth in claim 37, said second terminal portion (22b) being covered by an annular guiding member centered through said second cylindrical tube member (1).

* * * * *

UNITED STATES PATENT AND TRADEMARK OFFICE
CERTIFICATE OF CORRECTION

PATENT NO. : 5,154,264
DATED : October 13, 1992
INVENTOR(S) : Gregor Poertzgen and Castor Fuhrmann It is certified that error appears in the above-identified patent and that said Letters Patent is hereby corrected as shown below:

Col. 10, line 25, "circumferentially" should read --circumferential--;
Col. 14, line 11, "on part" should read --in part--;
Col. 14, line 53, "(22e)" should read --(22e$_1$)--;
Col. 14, line 59, "(22e)" should read --(22e$_1$)--;
Col. 14, line 61, "(22d)" should read --(22d),--;
Col. 14, line 63, "(22e)" should read --(22e$_1$)--.

Signed and Sealed this

Twenty-first Day of December, 1993

Attest:

BRUCE LEHMAN

Attesting Officer          Commissioner of Patents and Trademarks